United States Patent [19]

Terada

[11] Patent Number: 5,363,085
[45] Date of Patent: * Nov. 8, 1994

[54] WHEEL MARKER FOR VEHICLE

[75] Inventor: Toshiyuki Terada, Tokyo, Japan

[73] Assignee: Stanley Electric Co., Ltd., Tokyo, Japan

[*] Notice: The portion of the term of this patent subsequent to Oct. 18, 2011 has been disclaimed.

[21] Appl. No.: 929,176

[22] Filed: Aug. 11, 1992

[30] Foreign Application Priority Data

Aug. 20, 1991 [JP] Japan .............................. 3-72992[U]

[51] Int. Cl.⁵ .............................................. B60Q 1/00
[52] U.S. Cl. ...................................... 340/425.5; 62/78; 62/191; 62/252; 62/800
[58] Field of Search ............... 340/425.5; 362/78, 191, 362/252, 800, 249, 72

[56] References Cited

U.S. PATENT DOCUMENTS

| | | | |
|---|---|---|---|
| 3,675,199 | 7/1972 | Jamison et al. | 340/425.5 |
| 4,430,692 | 2/1984 | Papadakis | 362/78 |
| 4,562,516 | 12/1985 | Chastain | 362/78 |
| 4,775,919 | 10/1988 | Pearsall et al. | 362/78 |
| 4,800,469 | 1/1989 | Leon | 362/78 |
| 4,881,153 | 11/1989 | Scott | 362/78 |
| 5,074,706 | 12/1991 | Paulos | 340/435 |

Primary Examiner—John K. Peng
Assistant Examiner—Nina Tong
Attorney, Agent, or Firm—Louis Weinstein

[57] ABSTRACT

A wheel marker disposed on a wheel cap so as to allow the present rotating state of wheels of a vehicle to be visually recognized from a remote location includes as essential components a light emitting section radially extending toward the center of the wheel cap, a brightness detecting sensor disposed at the central part of the wheel cap on and along the outer surface thereof, an inverter disposed on the inner surface of the wheel cap, and a battery disposed on the inner surface of the wheel cap to serve as a power source. The light emitting section includes a light emitting element which usually comprises an electroluminescence element or a light emitting diode. In response to an output from the brightness detecting photosensor, the inverter is activated to turn on or turn off the battery. To turn off the battery when there is no need of activating the light emitting section, e.g., in the daytime, a power switch is disposed in position on the outer surface of the wheel cap.

10 Claims, 2 Drawing Sheets

WHEEL MARKER FOR VEHICLE

BACKGROUND OF THE INVENTION

1. Field of the Invention

The present invention relates generally to a wheel marker disposed on a wheel cap to be mounted on a wheel of a vehicle. More particularly, the present invention relates to a wheel marker of the foregoing type which assures that the present rotating state of a wheel of the vehicle can visually be recognized from a remote location especially in the nighttime.

2. Description of the Related Art

A conventional wheel a of a vehicle is shown in FIG. 3. As is apparent from the drawing, a wheel cap b made of a metallic material or molded of a synthetic resin is mounted on the wheel in order to improve exterior design of the wheel and reduce air resistance against rotation of the wheels.

Since no illuminating unit has hitherto been mounted on the wheel, the position of the wheel can not be visually recognized when a vehicle runs especially in the nighttime. In addition, the present rotating state of the wheel can not be detected or monitored at all in the nighttime.

SUMMARY OF THE INVENTION

The present invention has been made with the foregoing background in mind.

An object of the present invention is to provide a wheel marker disposed on a wheel cap to be mounted on a wheel of a vehicle wherein not only the present rotating state of the vehicle but also the position of the same can visually be recognized especially in the nighttime.

According to the present invention, there is provided a wheel marker disposed on a wheel cap to be mounted on a wheel of a vehicle, wherein the wheel marker comprises a light emitting section radially extending toward the center of the wheel cap, the light emitting section including a light emitting element; a brightness detecting photosensor disposed at the center of the wheel cap, the brightness detecting photosensor being located on the front side (i.e. exposed outer surface) of the wheel cap; an inverter having a brightness output processing circuit and a light emitting element activating circuit incorporated therein, the inverter being located on the rear side (i.e. inner surface) of the wheel cap; and a battery serving as a power source, the battery being located on the rear side of the wheel cap.

The light emitting element and the brightness detecting photosensor are electrically connected to the inverter via lead wires, while the battery is electrically connected to the same via a lead wire.

In response to an output from the brightness detecting photosensor, the inverter is activated to turn on or off the battery.

Usually, an electroluminescence element is employed for the light emitting element. Alternatively, a light emitting diode may be employed for it.

The light emitting section is fitted to a radially extending slit-shaped opening portion which is punched through a part of the wheel cap.

To turn off the battery when there is no need of activating the light emitting section, e.g., in the daytime, a power switch is disposed in position on the front surface of the wheel cap. To this end, the power switch is electrically connected to the battery via a lead wire.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Figure 1:
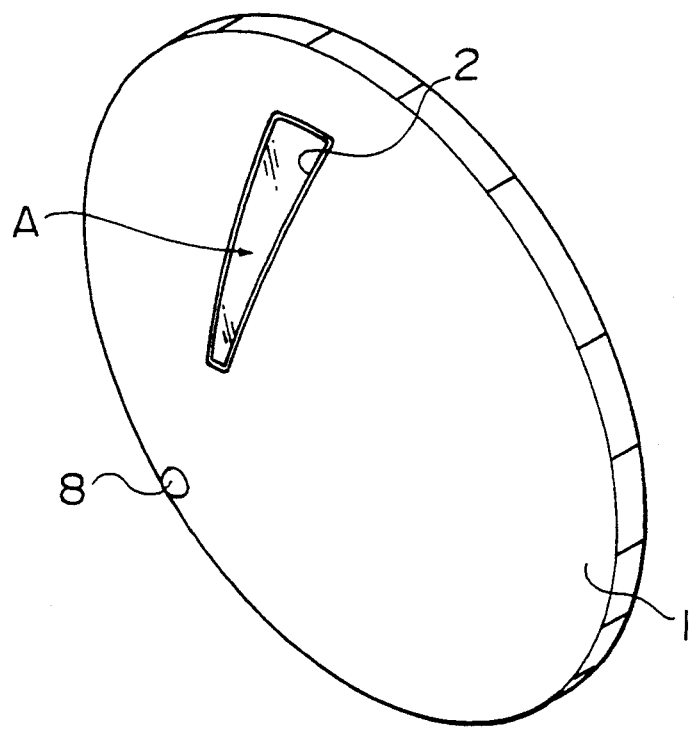
FIG. 1 is a perspective view of a wheel cap for a vehicle wherein the wheel cap includes a wheel marker in accordance with an embodiment of the present invention.
Figure 2:
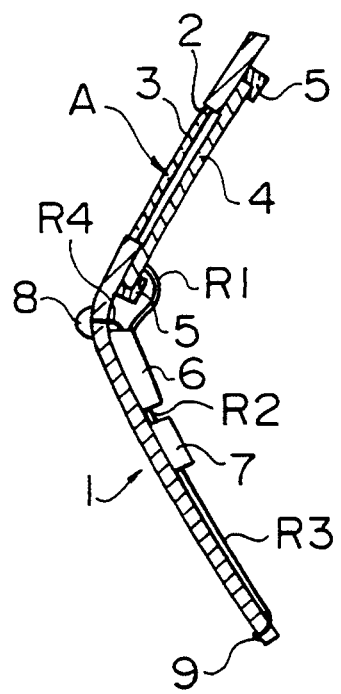
FIG. 2 is a fragmentary sectional view of the wheel cap shown in FIG. 1, particularly illustrating essential components constituting the wheel marker.
Figure 3:
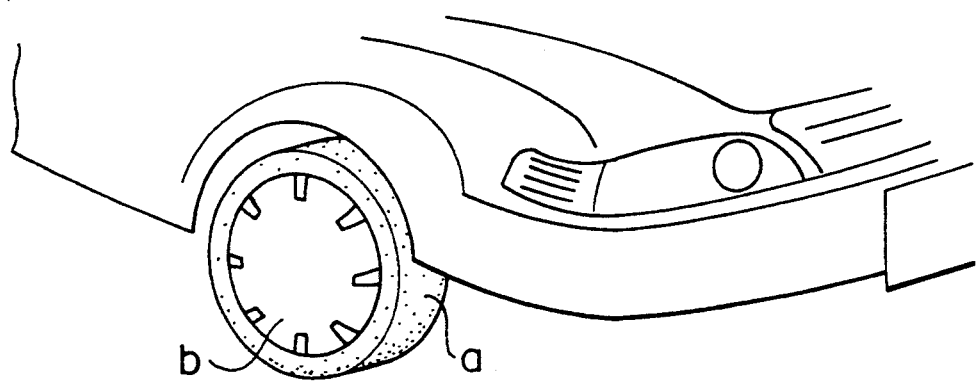
FIG. 3 is a fragmentary perspective view of a vehicle, particularly illustrating a conventional wheel cap mounted on a wheel of the vehicle.

The present invention will be described in detail hereinafter with reference to FIG. 1 and FIG. 2 which illustrate a wheel marker for a vehicle in accordance with a preferred embodiment of the present invention.

The wheel marker includes a radially extending light emitting section A on a wheel cap 1 made of a metallic material or molded of a synthetic resin, and a photosensor 8 is disposed at the substantially central part of the wheel cap 1 on the front side so as to detect the present brightness of the environment through which a vehicle is running.

A radially extending slit-shaped opening portion 2 is punched through a part of the wheel cap 1 to receive the light emitting section A while it is oriented toward the center of the wheel cap 1. A transparent protective cover 3 is fitted to the opening portion 2 and a light emitting element 4 such as an electroluminescence element or the like is firmly held on the rear side of the protective cover 3 with the aid of a holder 5.

In the shown embodiment, the light emitting section A is designed in the linearly extending slit-shaped contour. However, the present invention should not be limited only to this contour. Alternatively, another contour may be substituted for the slit-shaped one, provided that it is proven that it is practically employable for the light emitting section A. The opening portion 2 is dimensioned to have an arbitrary width along the slit-shaped contour.

In addition to the electroluminescence element, a light emitting diode, a bulb or the like are employable for the light emitting element 4.

An inverter 6 having a brightness output processing circuit and a light emitting element activating circuit incorporated therein as well as a battery 7 are immovably held on the rear side of the wheel cap 1 with the aid of screws (not shown).

The light emitting element 4 is electrically connected to the inverter 6 via a lead wire R1, while the photosensor 8 is electrically connected to the inverter 6 via a lead wire R4. Additionally, the inverter 6 is electrically connected to the battery 7 via a lead wire R2.

A power switch 9 is mounted in position on the outer surface of the wheel cap 1 in order to turn off the battery (power source) 7 when the vehicle does not run or when no lighting is required, e.g., in the daytime, and the power switch 9 is electrically connected to the battery 7 via a lead wire R3.

As described above, since the light emitting element constituting the light emitting section is linearly arranged while radially extending toward the center of the wheel cap, the wheel cap can visually be recognized as if it is illuminated during rotating of tires (wheels) at a high speed. On the contrary, while the tires rotate at a low speed, the light emitting section is visually recognized as if a band-shaped illuminated pattern rotates around the tire on which the wheel marker is disposed. In other words, the wheel marker of the present invention represents an illuminating state corresponding to the present rotational speed of the tires (wheels).

Since the converter and the battery are arranged on the rear side of the wheel cap and they are previously electrically connected to each other via lead wires, a user is not required to perform any special wiring operation when a wheel cap is mounted on a wheel.

While the present invention has been described above with respect to a single preferred embodiment thereof, it should of course be understood that the present invention should not be limited only to this embodiment but various changes or modifications may be made without departure from the scope of the present invention as defined by the appended claims.

What is claimed is:

1. A wheel marker for a vehicle including a solar cell and disposed on a wheel cap to be mounted on a wheel of a vehicle, comprising:

said wheel cap having an exposed outer surface and an inner surface facing said wheel, a light emitting section radially extending toward a center of said wheel cap, a solar cell electricity generating section arranged around the central part of said wheel cap on the inner surface and including an opening in the wheel cap to receive sunshine in the day time, said solar cell electricity generating section including a solar cell, a brightness detecting photosensor disposed at the center of said wheel cap, said brightness detecting photosensor being located on the outer surface of said wheel cap, an inverter located on the inner surface of said wheel cap, and a battery serving as a power source for said light emitting section, photosensor and inverter, said battery being located on the inner surface of said wheel cap and being charged by said solar cell, said light emitting section, photosensor, inverter and battery being electrically connected together so as to cause the light emitting section to change its light output with changes in the light detected by the photosensor.

2. The wheel marker according to claim 1, wherein said light emitting section and said brightness detecting photosensor are electrically connected to said inverter via lead wires, while said battery is electrically connected to the same via a lead wire.

3. The wheel marker according to claim 1, wherein in response to an output from said brightness detecting photosensor, said inverter is activated to turn on or off said battery.

4. The wheel marker according to claim 1, wherein said light emitting section comprises an electro-luminescence element.

5. The wheel marker according to claim 1, wherein said light emitting section comprises a light emitting diode.

6. The wheel marker according to claim 1, wherein said light emitting section is received in a radially extending slit-shaped opening which is punched through a part of said wheel cap.

7. The wheel marker according to claim 1 further including a power switch disposed on the outer surface of said wheel cap to turn off said battery when there is no need of activating said light emitting section, said power switch being electrically connected to said battery via a lead wire.

8. The wheel marker of claim 1 wherein said inverter changes the illumination of said light emitting section according to an intensity of light in a region of the wheel marker detected by said photosensor.

9. The wheel marker of claim 1 wherein said light emitting section is displaced from the center of said wheel cap.

10. The wheel marker of claim 1 wherein said light emitting section further comprises a transparent member providing a protective cover for said light emitting section.

* * * * *